US008103125B2

(12) United States Patent
Martin

(10) Patent No.: US 8,103,125 B2

(45) Date of Patent: Jan. 24, 2012

(54) GENERATING AN AMALGAMATED IMAGE INCLUDING A STATIC IMAGE AND A DYNAMIC IMAGE

(75) Inventor: Maykel Martin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 11/685,387

(22) Filed: Mar. 13, 2007

(65) Prior Publication Data

US 2008/0226195 A1 Sep. 18, 2008

(51) Int. Cl.
*G06K 9/36* (2006.01)
*G09G 5/00* (2006.01)

(52) U.S. Cl. ........ 382/284; 345/629; 345/632; 345/634; 345/638; 345/641

(58) Field of Classification Search .................. 382/287, 382/284
See application file for complete search history.

(56) References Cited

U.S. PATENT DOCUMENTS 4,521,771 A * 6/1985 Alton ................................ 345/9
4,675,676 A 6/1987 Takanabe et al.
4,807,157 A 2/1989 Fukushima et al.
4,972,319 A 11/1990 Delorme
5,109,399 A 4/1992 Thompson
5,249,967 A * 10/1993 O'Leary et al. ............... 434/247
5,261,030 A * 11/1993 Brooke ......................... 345/639
5,313,585 A * 5/1994 Jeffries et al. ................. 711/201
5,414,462 A 5/1995 Veatch
5,453,575 A * 9/1995 O'Donnell et al. ........... 600/463
5,543,857 A * 8/1996 Wehmeyer et al. ........... 348/589
5,977,977 A * 11/1999 Kajiya et al. .................. 345/418
5,991,444 A * 11/1999 Burt et al. ..................... 382/232
6,081,262 A * 6/2000 Gill et al. ...................... 715/202
6,356,297 B1 * 3/2002 Cheng et al. .................... 348/36
6,590,577 B1 * 7/2003 Yonts ............................ 345/440
7,042,449 B2 * 5/2006 Khan ............................ 345/420
7,173,672 B2 * 2/2007 Gibbs et al. ................... 348/589
7,460,730 B2 * 12/2008 Pal et al. ....................... 382/284
7,554,539 B2 * 6/2009 Balfour ......................... 345/419
2003/0005226 A1 * 1/2003 Hong ............................ 711/119
2003/0055881 A1 * 3/2003 Ngo ............................. 709/203
2005/0047672 A1 * 3/2005 Ben-Ezra et al. ............. 382/255
2007/0038939 A1 * 2/2007 Challen et al. ................ 715/734
2008/0085096 A1 * 4/2008 Marshall ......................... 386/52

OTHER PUBLICATIONS

GIS for Business, http://www.esri.com/industries/business/index.html, Spring 2011, p. 1, ArcNews.
Esri Industries GIS Mapping Solutions for Industry, http://www.esri.com/industries.html, p. 1.

(Continued)

*Primary Examiner* — Vikkram Bali
*Assistant Examiner* — Michelle Entezari
(74) *Attorney, Agent, or Firm* — Owen J. Gamon

(57) ABSTRACT

In an embodiment, a request is received that includes a specification of a static location and a dynamic location. A static image is created that includes a map that represents an area centered around the static location. A dynamic image is created asynchronously from the creation of the static image. An amalgamated image is generated that includes the static image and the dynamic image, which is over a portion of the static image. In this way, spatial data may be drawn in a manner that increases performance.

14 Claims, 5 Drawing Sheets

OTHER PUBLICATIONS

MapInfo (R) is now Pitney Bowes Business Insight, http://www.pbinsight.com/welcome/mapinfo?txtTopNav=4a4a2545d8a37f00dev-vcm100001a031dc7__, p. 1-2, Pitney Bowes Software Inc.

Location Intelligence Conference 2011, http://www.locationintelligence.net/articles/2059.html, 2011, p. 1, Directions Media.

Oracle and Hyperion, http://www.hyperion.com/solutions/industry__solutions/retail/map__intelligence.cfm, p. 1.

* cited by examiner

GENERATING AN AMALGAMATED IMAGE INCLUDING A STATIC IMAGE AND A DYNAMIC IMAGE

FIELD

An embodiment of the invention generally relates to computer systems and more specifically relates to creating a map of spatial data with an amalgamated image that includes a static image and a dynamic image.

BACKGROUND

Computer systems are fundamentally used for the storage and manipulation of data. One type of data that is commonly stored, manipulated, and displayed by computer systems is called spatial data, which is data that represents or maps space in the physical world. Examples of spatial data include road maps, terrain maps, and weather maps. Spatial data is commonly used by applications that provide navigation, orientation, and representation of the progress of movement of moving persons, vehicles, or weather patterns.

Normally these applications use a Geographic Information System (GIS) or internet mapping software, running on general purpose spatial servers to query and render base maps. Base maps are then enriched with other data, in order to present useful information. General purpose spatial servers are composed of three key components: a general purpose DBMS (database management system) with additional spatial extensions to allow for spatial data storage and indexed queries through spatial indexes, a spatial data rendering engine, which renders the spatial data into images once the data is retrieved by queries to the database system, and general purpose server hardware and operating systems that run the software components.

These general purpose spatial systems are often rich in functionality. For example, in addition to retrieving and rendering spatial data, they support functions such as online insertion and update of spatial objects and transactions against spatial data. But, given that these general purpose spatial systems are architected to run in general purpose hardware, they cannot take advantage of a very large set of optimizations that can be applied to the spatial data retrieval, rendering, and image generation, given the assumption that the spatial data is read only and has a known size. For this reason, general purpose spatial data servers are very resource intensive on general purpose server hardware, which can lead to performance degradation.

Thus, what is needed is a technique for retrieving spatial data that provides better performance than does a general purpose spatial data server.

SUMMARY

A method, apparatus, system, and storage medium are provided. In an embodiment, a request is received from a client that includes a specification of a static location and a dynamic location. A static image is created that includes a map that represents an area centered around the static location. A dynamic image is created asynchronously from the creation of the static image. An amalgamated image is generated that includes the static image and the dynamic image, which is over a portion of the static image. The amalgamated image is then sent to the client, which may display the amalgamated image. In this way, spatial data may be drawn in a manner that increases performance.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a request is received from a client. The request includes a specification of a static location and a dynamic location. A static image is created that includes a map that represents an area centered around the static location. In an embodiment, a dynamic image is created asynchronously, independently, and in parallel (at the same time) with the creation of the static image. An amalgamated image is generated that includes the static image and the dynamic image, which is over a portion of the static image. The amalgamated image is then sent to the client. In an embodiment, the dynamic image is moved to different dynamic locations in the amalgamated image without redrawing the static image in response to the different dynamic locations being received from the client. In this way, spatial data may be drawn in a manner that increases performance.

Figure 1:
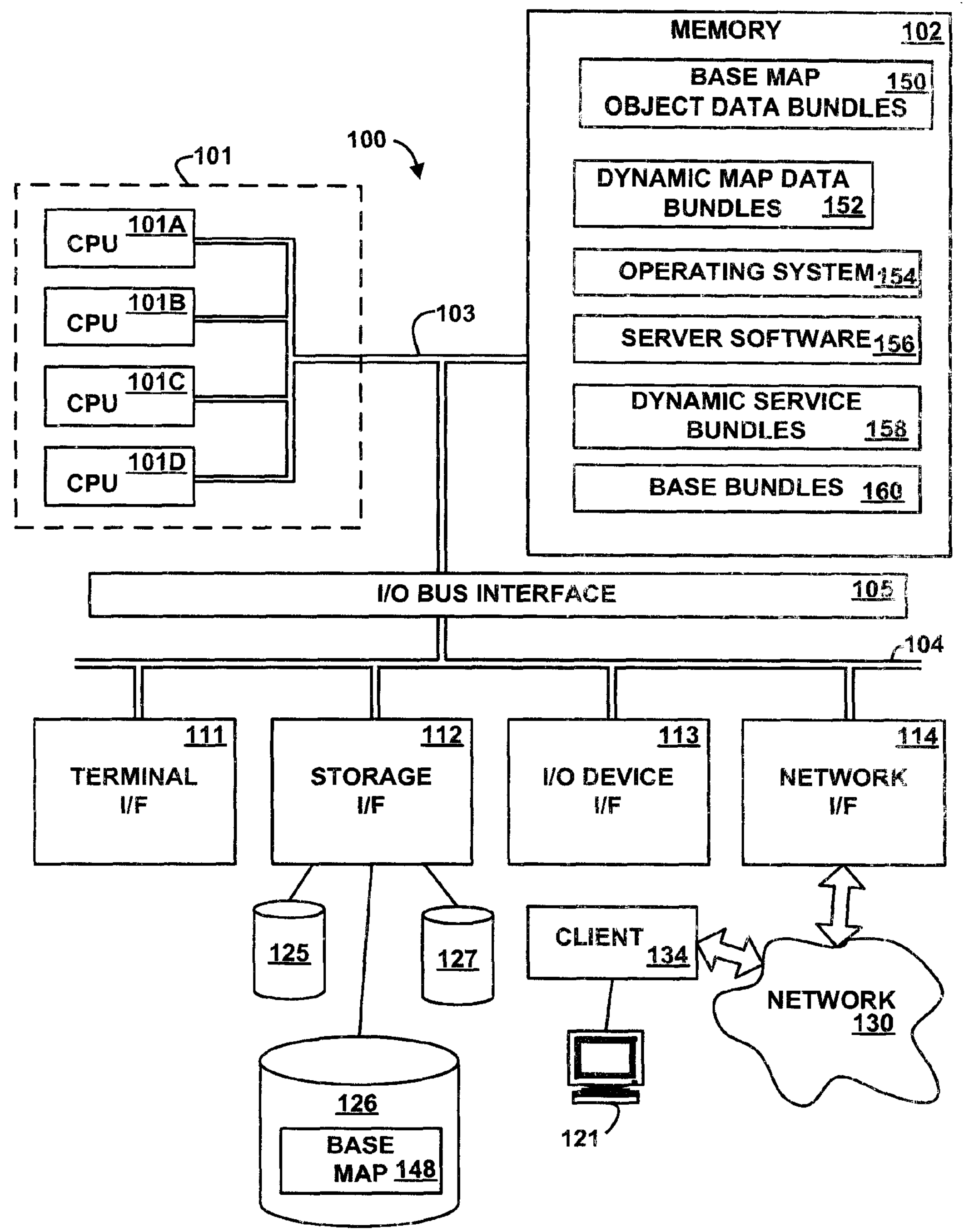
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 134 via a network 130, according to an embodiment of the present invention. The terms "client" and "server" are used herein as labels that describe the various roles that the computer systems may assume and are included herein for convenience of exposition, only. In fact, in various embodiments, a particular computer system that acts in the role of a client or a server in one scenario may act as another role in another scenario.

In an embodiment, the hardware components of the computer systems 100 and 134 may be implemented by an eServer iSeries computer system available from International Business Machines Corporation of Armonk, N.Y. But, those skilled in the art will appreciate that the mechanisms and apparatus of embodiments of the present invention apply equally to any appropriate computing system.

The major components of the server computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache. In an embodiment, the processor 101 is implemented via SIMD (Single Instruction Multiple Data) processing engines (e.g., the Cell processor), which hardware accelerates graphic primitives for the rendering of spatial data and generation of image formats. Examples of image formats include JPEG (Joint Photographic Experts Group), GIF (Graphics Interchange Format), and TIFF (Tagged Image File Format), but in other embodiments other formats may be used. In an embodiment, the processor 101 supports multithreaded environments.

The main memory 102 is a random-access semiconductor memory for storing or encoding data and programs. In another embodiment, the main memory 102 represents the entire virtual memory of the server computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes base map object data bundles 150, dynamic map data bundles 152, an operating system 154, server software 156, dynamic service bundles 158, and base bundles 160. Although the base map object data bundles 150, the dynamic map data bundles 152, the operating system 154, the server software 156, the dynamic service bundles 158, and the base bundles 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the base map object data bundles 150, the dynamic map data bundles 152, the operating system 154, the server software 156, the dynamic service bundles 158, and the base bundles 160 are illustrated as being contained within the main memory 102, these elements are not necessarily all completely contained in the same storage device at the same time. Further, although the base map object data bundles 150, the dynamic map data bundles 152, the operating system 154, the server software 156, the dynamic service bundles 158, and the base bundles 160 are illustrated as being separate entities, in other embodiments some of them, portions of some of them, or all of them may be packaged together.

The base map object data bundles 150 provide a set of read-only spatial data, which may include multiple views. The base bundles 160 render the base map object data bundles 150 as static images. In various embodiments, the way in which the base map object data bundles 150 are rendered may be specified by the server software 156, by the base bundles 160, or a combination of both. For example, for geographic maps, each level of geography (e.g. state, county, and city) has its own data set that can be used for the different services that require it. In an embodiment, the base bundles 160 provide accelerating algorithms, such as map reduction algorithms, used to minimize the number of points of the base map object data bundles 150 to be rendered. The base bundles 160 may also provide Fast Fourier Transform (FFT), Discrete Cosine Transform (DCT), and Huffman Coding encoder algorithms. The base map object data bundles 150 are further described below with reference to FIG. 3. The base bundles 160 are further described below with reference to FIG. 6.

The dynamic map object data bundles 152 provide dynamic data that may be displayed as dynamic images that move to different dynamic locations relative to the static images. The dynamic map object data bundles 152 are further described below with reference to FIG. 4. The dynamic service bundles 158 render the dynamic object data bundles 152 as dynamic objects. The dynamic service bundles 158 are further described below with reference to FIG. 5.

The operating system 154 supports a multi-threaded environment and provides SIMD instruction support, integrating with the processor 101 and exposing an API (Application Program Interface) for the SIMD instructions, so that invokers of the operating system 154, such as the base bundles 160, may take advantage of the SIMD instructions.

The server software 156 receives requests from the client computer system 134 and returns a rendering of the spatial data (the base map object data bundles 150 and the dynamic map data bundles 152) requested as images after processing the given request. In various embodiments, the requests may be formatted in XML (Extensible Markup Language), OGC (Open Geospatial Consortium), or any other appropriate format.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

A storage device, such as the storage device 126, includes the base map 148, which includes spatial data. The server software 156 reads the base map 148 from the storage device 126 and creates the base map object data bundles 150 based on the base map 148. Although the base map 148 is illustrated as being stored in one storage device 126, the base map 148 may be stored across multiple storage devices. All spatial queries to the base maps are served directly from the base map object data bundles 150, which are resident in the memory 102, as opposed from the secondary storage device 126. Storing the spatial data in the memory 102 avoids the inefficiency of secondary storage access and avoids the overhead of converting the spatial objects as stored on disk to the rendering API (Application Program Interface) format at the time of the request from the client computer system 134. This optimization also eliminates the complexity of implementing a caching strategy for spatial objects to improve spatial query performance.

The I/O (Input/Output) device interface 113 provides an interface to any of various other input/output devices or devices of other types, such as printers, fax machines, or any other devices. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user “mainframe” computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client computer system 134 may include some or all of the hardware components as previously described above for the server computer system 100. The client 134 sends requests for mapping services to the server software 156. The client computer system 134 supports the attachment of one or more user terminals 121. The user terminal 121 may include a keyboard, video display terminal, speakers, a mouse or other pointing device, or any other input and/or output device via which a user can submit input and/or receive output to and/or from the computer system 134.

It should be understood that FIG. 1 is intended to depict the representative major components of the computer systems 100 and 134 and the network 130 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as “computer programs,” or simply “programs.” The computer programs typically comprise one or more instructions that are resident at various times in various memory and storage devices in the computer systems 100 and 134, and that, when read and executed by one or more processors in the computer systems 100 and 134, cause the computer systems 100 and 134 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer systems 100 and 134 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the computer systems 100 and 134 by a communications medium, such as through the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
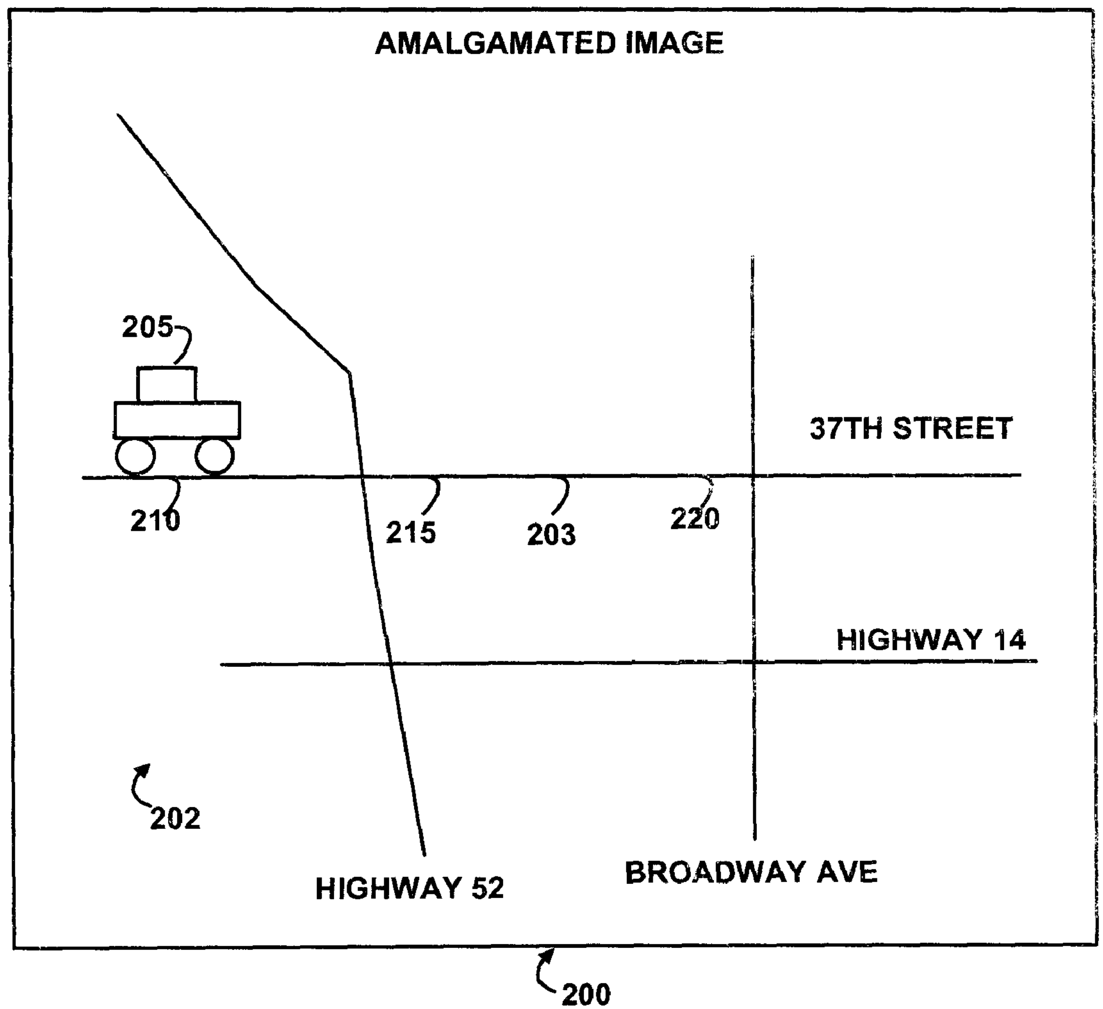
FIG. 2 depicts a high-level block diagram of an example amalgamated image, according to an embodiment of the invention.

FIG. 2 depicts a high-level block diagram of an example amalgamated image 200, according to an embodiment of the invention. The server software 156, the dynamic service bundles 158, and the base bundles 160 create the amalgamated image 200, and the client computer system 134 displays the amalgamated image 200 on the user terminal 121.

The amalgamated image 200 includes a static image 202 and a dynamic image 205. The base bundles 160 create the static image 202 and the dynamic service bundles 158 create the dynamic image 205. The dynamic image 205 is displayed on, over, or on top of, the static image 202 and obscures, partially or completely, a portion of the static image 202. The dynamic image 205 moves over time with respect to the static image 202 to various locations over the static image portion 202 in the amalgamated image, during which time the static image 202 remains fixed, stationary, or does not move. For example, the dynamic image 205 may move, over time, from a current location 210 over the static image 202 to an intermediate location 215 over the static image 202, and to a final location 220 over the static image 202 during a time period. The dynamic image 205 is an icon whose movement over the static image 202 represents movement of a physical object through the area represented by the map of the amalgamated image 200. In the example shown, the dynamic image 205 represents an automobile, but in other embodiments, the dynamic image 205 may represent a person, an airplane, a truck, a ship, a motorcycle, a bicycle, or other type of object capable of movement.

The static image 202 is a map, having a map center 203. The map of the static image 202 represents an area centered around a location that corresponds to the map center 203. In the example show, the map is a road map that includes lines and symbols that represent an area that includes roads, streets, avenues, and highways. In another embodiment, the static image may be a weather map, a topography map, a grid, or may include any type of spatial data representing any type of spatial area.

Figure 3:
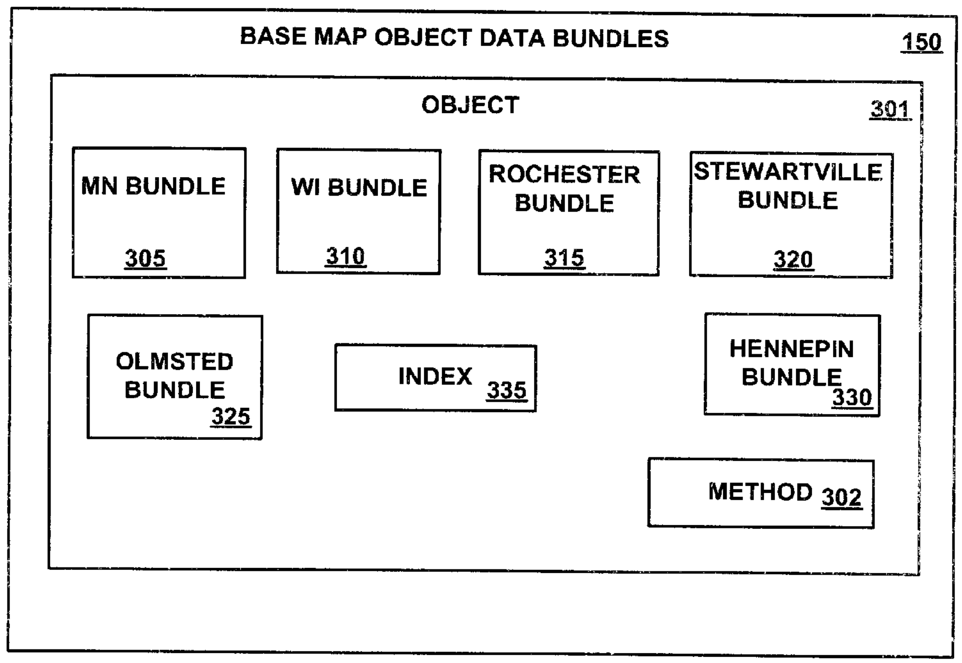
FIG. 3 depicts a high-level block diagram of example base map data bundles, according to an embodiment of the invention.

FIG. 3 depicts a high-level block diagram of example base map object data bundles 150, according to an embodiment of the invention. The base map object data bundles 150 are implemented as an object 301, according to the concepts of object oriented programming. In object oriented programming, an object is an instantiation of, or a particular instance of, a class. A class defines the abstract characteristics of an object, including the object's characteristics (its attributes or properties) and the methods that the object can perform. Classes provide modularity and structure in an object-oriented computer program. Collectively, the properties and methods defined by a class are called members. The set of values of the attributes of a particular object is called the state of the object.

A method is its object's abilities or actions and are implemented as code or instructions capable of being executed by a processor or statements capable of being interpreted by instructions that execute on a processor. Message passing is the process by which an object sends data to another object or requests the other object to invoke one of its methods.

Encapsulation conceals the exact details of how a particular class works from objects that use its code or send messages to it. Encapsulation is achieved by specifying which classes may use the members of an object. The result is that each object exposes to any class a certain interface those members accessible to that class. Data is said to be encapsulated within an object because the data may only be accessed by invoking the methods of the object. Each object can be viewed as an independent machine with a distinct role.

Objects exist only within contexts that are aware of them, and a piece of computer memory only holds an object if a program treats it as an object (for example by reserving it for exclusive use by specific procedures and/or associating a data type with it). Thus, the lifetime of an object is the time during which it is treated as an object.

As illustrated in FIG. 3, the base map object data bundles 150 include an object 301, which provides a set of encapsulated read-only spatial data 305, 310, 315, 320, 325, and 330, an index 335, and a method 302. The object 301 is said to encapsulate the data 305, 310, 315, 320, 325, and 330, the index 335, and the method 302, meaning that the data 305, 310, 315, 320, 325, and 330 may only be accessed via invoking or sending messages to the method 302 of their encapsulating object 301. The data 305, 310, 315, 320, 325, and 330 illustrate an example of geographic maps where a variety of levels of geography (e.g. state, county, and city) has theirs own data set that can be used for the different services that require it. The server software 156 creates the object 301 from the base map 148. The data 305, 310, 315, 320, 325, and 330 include read-only, static data, which the base bundles 160 use to create a static image, such as the static image 202, as previously described above with reference to FIG. 2.

The index 335 is a data structure that supports in-memory indexing of the spatial data 305, 310, 315, 320, 325, and 330. In an embodiment, the index 335 implements R-Trees or R+-Trees. In another embodiment, the index 335 is any type of data structure for accessing the spatial data.

The method 302 includes instructions capable of executing on the processor 101 or statements capable of being interpreted by instructions that execute on the processor 101, which provide access to the spatial data bundles 305, 310, 315, 320, 325, and 330 via the index 335. The object 301 is capable of receiving messages, performing methods, and sending messages to other objects.

Figure 4:
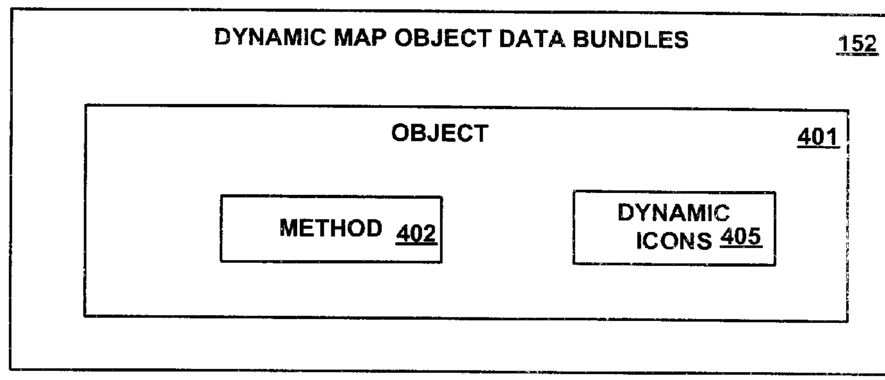
FIG. 4 depicts a high-level block diagram of example dynamic map object data bundles, according to an embodiment of the invention.

FIG. 4 depicts a high-level block diagram of example dynamic map object data bundles 152, according to an embodiment of the invention. The dynamic map object data bundles 152 include an object 401, which encapsulates a set of read-only dynamic data in the form of a dynamic icon 405 and a method 402. The object 401 is said to encapsulate the method 402 and the dynamic icons 405, meaning that the dynamic icons 405 may only be accessed via invoking or sending messages to the method 402 of its encapsulating object 401. The dynamic icons 405 illustrate an example of dynamic data, which the dynamic service bundles 158 use to create and render, e.g., the dynamic image 205, as previously described above with reference to FIG. 2.

The method 402 includes instructions capable of executing on the processor 101 or statements capable of being interpreted by instructions that execute on the processor 101, which provide access to the dynamic icons 405.

Figure 5:
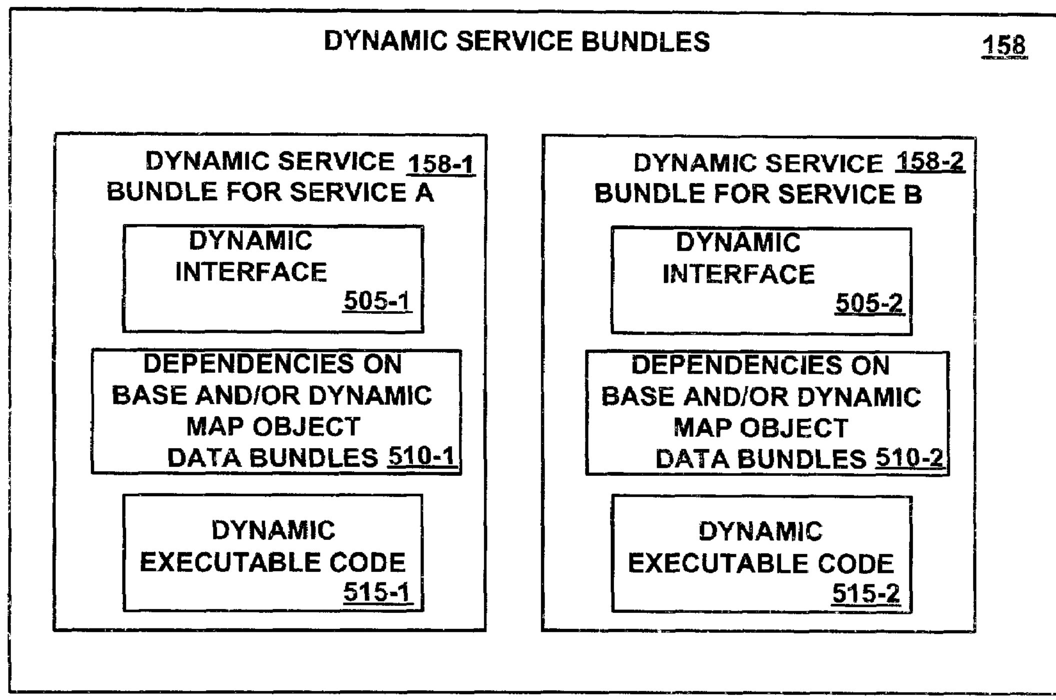
FIG. 5 depicts a high-level block diagram of example dynamic service bundles, according to an embodiment of the invention.

FIG. 5 depicts a high-level block diagram of dynamic service bundles 158, such as the dynamic service bundles 158-1 and 158-2, according to an embodiment of the invention. The dynamic service bundle 158-1 includes a dynamic interface 505-1, dependencies 510-1, and dynamic executable code 515-1. The dynamic service bundle 158-2 includes a dynamic interface 505-2, dependencies 510-2, and dynamic executable code 515-2.

The dynamic executable code 515-1 and 515-2 process requests and allow for configuration of the code. The dynamic interfaces 505-1 and 505-2 define and publish the type of services that the dynamic executable code 515-1 and 515-2, respectively, provide, the format of the calls, messages, or requests the dynamic service bundles must receive in order to perform the services, and the parameters that an administrator can modify to configure the services.

For example, the dynamic service bundle 158-1 may create a dynamic image for a car while the dynamic service bundle 158-2 may create a dynamic image for an airplane, and the dynamic interfaces 505-1 and 505-2 specify the images that the different base bundles 160-1 and 160-2 create. In other embodiments, different dynamic service bundles may perform any appropriate services, and any appropriate dynamic images may be used.

The dependencies 510-1 and 510-2 specify the base and/or dynamic map object data bundles that the dynamic executable code 515-1 and 515-2 need, in order to provide their services. The executable code 515-1 and 515-2 include instructions capable of executing on the processor 101 or statements capable of being interpreted by instructions executing on the processor 101 to perform the functions as further described below with reference to FIG. 7.

The dynamic service bundles 158-1 and 158-2 create dynamic images, such as the dynamic image 205, at dynamic locations, such as the dynamic location 210, 215, and 220, in response to receiving a specification of the dynamic location. The dynamic service bundles 158-1 and 158-2 create the dynamic images by reading the dynamic icons 405 via the method 402 and rendering the dynamic icons 405 as the dynamic images at the dynamic locations.

Figure 6:
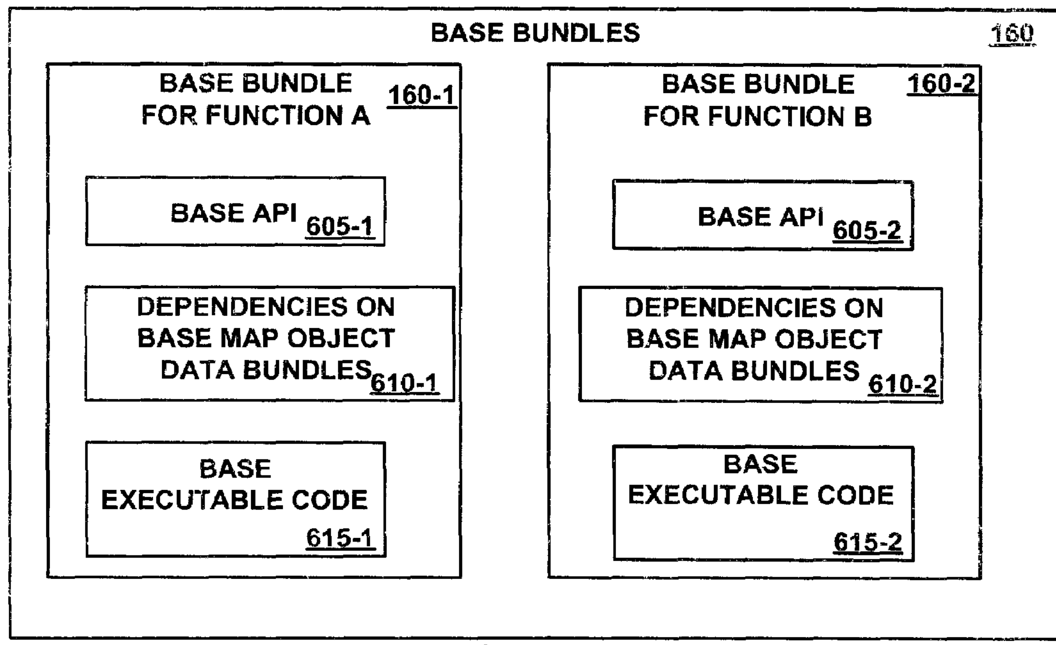
FIG. 6 depicts a high-level block diagram of example base bundles, according to an embodiment of the invention.

FIG. 6 depicts a high-level block diagram of example base bundles 160, such as the base service bundles 160-1 and 160-2, according to an embodiment of the invention. The base service bundle 160-1 includes a base API 605-1, dependencies 610-1, and base executable code 615-1. The base service bundle 160-2 includes a base API 605-2, dependencies 610-2, and base executable code 615-2.

The base executable code 615-1 and 615-2 process requests and allow for configuration of the code. The base APIs 605-1 and 605-2 define and publish the type of services that the base executable code 615-1 and 615-2, respectively, provide, the format of the calls, messages, or requests the respective base bundles 160-1 and 160-2 must receive in order to perform the services, and the parameters that an administrator can modify to configure the services. For example, the base bundle 160-1 may draw static images for one geographical location while the base bundle 160-2 may create static images for another geographical location, and the base APIs 605-1 and 605-2 specify the geographical locations that the different base bundles 160-1 and 160-2 create.

The dependencies 610-1 and 610-2 specify the base map object data bundles 150 that the base executable code 615-1 and 615-2 need, in order to provide their services. The executable code 615-1 and 615-2 include instructions capable of executing on the processor 101 or statements capable of being interpreted by instructions executing on the processor 101 to perform the functions as further described below with reference to FIG. 7.

Figure 7:
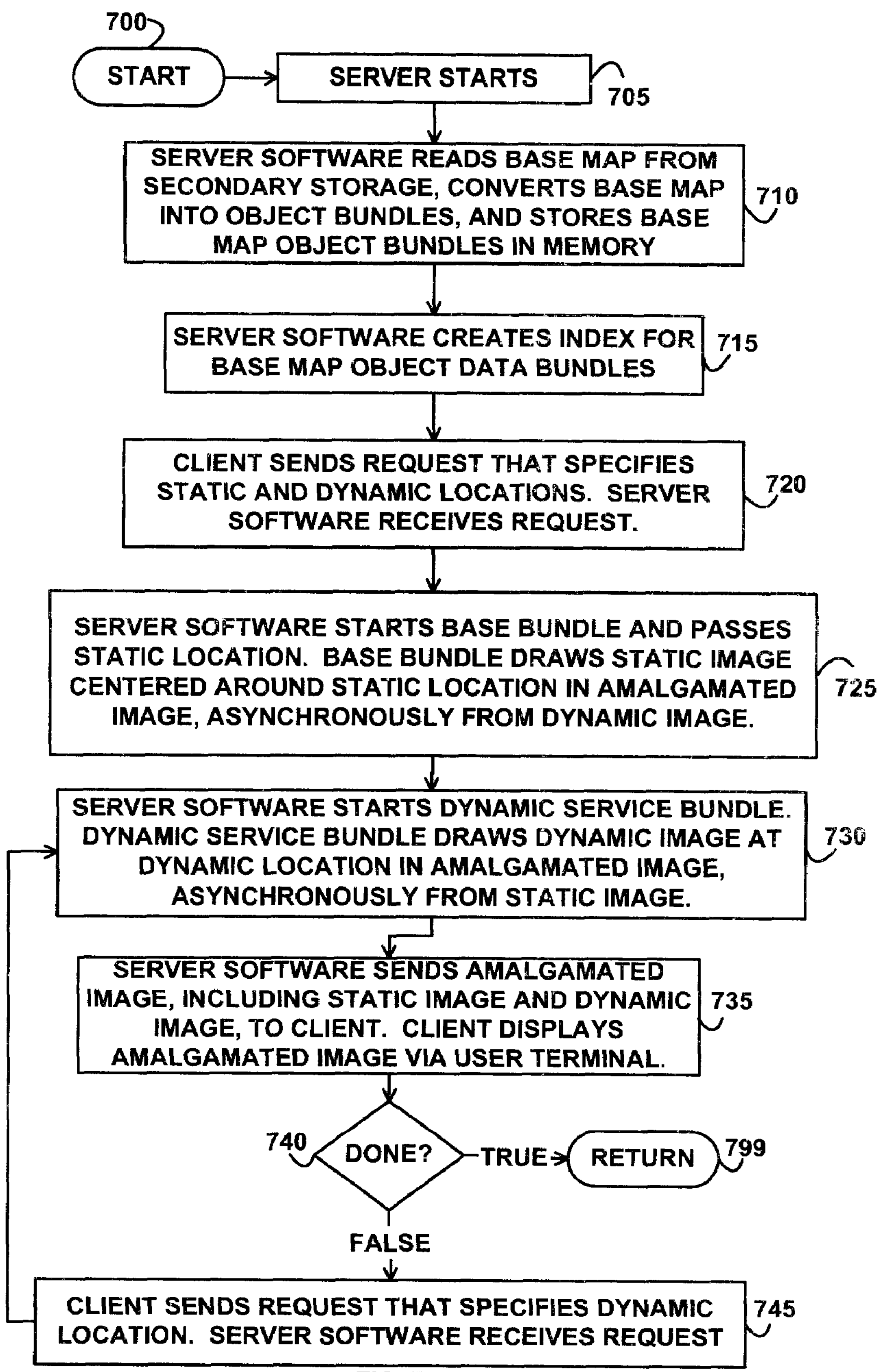
FIG. 7 depicts a flowchart of example processing for generating an amalgamated image, according to an embodiment of the invention.

FIG. 7 depicts a flowchart of example processing for generating an amalgamated image, according to an embodiment of the invention. Control begins at block 700. Control then continues to block 705 where the server computer system 100 starts, and the operating system 154 initializes and begins executing on the processor 101. Control then continues to block 710 where, in response to the start or initialization of the operating system 154, the server software 156 reads the base map 148 from secondary storage, converts the base map 148 into the base map object data bundles 150, and stores the base map object data bundles 150 in the memory 102, prior to receiving or processing any requests for spatial data from the client computer system 134. The server software 156 converts the base map 148 into base map object data bundles 150 by instantiating objects, such as the object 301, from classes and loading spatial data from the base map 148 into the data bundles 305, 310, 315, 320, 325, and 330. Control then continues to block 715 where the server software 156 creates the index 335 for the base map object bundles 150.

Control then continues to block 720 where the client computer system 134 sends a request to the server software 156, and the server software 156 receives the request. The request includes a specification of a static location and a dynamic location. In various embodiments, the locations may be specified in terms of street addresses (including any, some or all of house numbers, street names, city names, county names, zip codes or zones, states, and/or countries), latitude and longitude, grid coordinates, or any other appropriate units. The static location specifies a location around which the client desires the map to be centered. The dynamic location specifies a location of a moving object, such as a vehicle, pedestrian, automobile, boat, or airplane. In an embodiment, the dynamic location represents the location of the client computer system 134, but in other embodiments any moveable object may be located at the dynamic location. In an embodiment, the dynamic location and the static location are initially identical, and the dynamic location moves away from the static location over time and the moving object moves; thus, the static location represents the starting location of the moving object. In another embodiment, the dynamic location and the static location are initially different and the dynamic location moves toward the static location over time; thus, the static location represents the destination of the moving object. In another embodiment, the static location is arbitrary.

Control then continues to block 725 where the server software 156 determines the base bundle (e.g., the base bundle 160-1 or 160-2) that handles the spatial data of the static location, invokes the determined base bundle or starts the determined base bundle executing, and passes the static location to the base executable code of the determined base bundle via the base API. The server software 156 determines the correct base bundle by reading the base API 605-1 and 605-2 and comparing the static location of the received request to the locations handled by the base bundles 160, as specified in the base API. The base bundle creates or draws the static image 202 centered around the static location, asynchronously from any creation of the dynamic image 205. The static image 202 is the static portion of the amalgamated image.

Control then continues to block 730 where the server software 156 determines the correct dynamic service bundle, starts the determined dynamic service bundle executing, and passes the dynamic location to the dynamic service bundle, asynchronously from the creation of the static image 202. That is, the dynamic service bundle may execute in a thread, task, or process that is asynchronous from the thread, task, or process that executes the base bundle. Thus, the creation of the static image executes independently from the creation of the dynamic image, the static and dynamic images may be created in parallel (at the same time), the timing of the creation of the static and dynamic images is not synchronized, and the creation of the static and dynamic images may start and finish in any order. The dynamic service bundle creates or draws the dynamic image 205 at the dynamic location in the amalgamated image. The dynamic image 205 is the dynamic portion of the amalgamated image 200, and the dynamic image 205 is over the static image 202, so that the dynamic image 205 obscures a portion of the static image 202 and is displayed on top of a portion of the static image 202. Thus, the amalgamated image is generated that includes the static image and the dynamic image.

Control then continues to block 735 where, once the creation of the amalgamated image, including the static image and the dynamic image, is complete, the server software 156 sends the amalgamated image 200, including the static image 202 and the dynamic image 205, to the client computer system 134, and the client computer system 134 displays the amalgamated image 200 on the video display device of the user terminal 121. Control then continues to block 740 where the client computer system 134 determines whether it is done sending requests for spatial data to the server computer system 100.

If the determination at block 740 is false, then the client computer system 134 is not done sending requests for spatial data, so control continues to block 745 where the client computer system 134 sends another request to the server software 156, which specifies a different dynamic location and the same static location as the previous request. The server software 156 receives the request. Control then returns to block 730 where the server software 156 starts the dynamic service bundle and passes the new received dynamic location, as previously described above. Thus, the dynamic service bundle redraws or recreates the dynamic image 205 at the new dynamic location in the amalgamated image 200 without re-drawing the static image portion of the amalgamated image 200, and the dynamic service bundle moves the dynamic image 205 in the amalgamated image 200, by redrawing the dynamic image 205 at a new dynamic location in the amalgamated image 200.

If the determination at block 740 is true, then the client computer system 134 has no more requests for spatial data to send, so control continues to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:

receiving a request from a client, wherein the request comprises a specification of a static location and a dynamic location;

creating a static image, wherein the static image comprises a map that represents an area centered around the static location, wherein the static image does not move;

creating a dynamic image asynchronously from the creating the static image;

generating an amalgamated image comprising the static image and the dynamic image, wherein the generating further comprises generating the dynamic image at the dynamic location over a portion of the static image;

sending the amalgamated image to the client; and moving the dynamic image in the amalgamated image with respect to the static image, wherein the moving further comprises receiving a second request from the client, wherein the second request comprises a new dynamic location and moving the dynamic image to the new dynamic location in response to the receiving the second request, wherein the moving represents a movement of a physical object through the area represented by the map, and wherein the dynamic location specifies a location of the client and wherein the dynamic location and the static location are initially identical and wherein the dynamic location moves away from the static location over time.

2. The method of claim 1, wherein the client displays the amalgamated image.

3. The method of claim 1, wherein the second request further comprises the static location.

4. The method of claim 1, wherein the creating the static image and the creating the dynamic image are performed in parallel.

5. The method of claim 1, further comprising:

creating object data representing the map prior to the receiving the request, wherein the creating the static image reads the object data.

6. A method for deploying computing services, comprising:

integrating computer readable code into a computer system, wherein the code in combination with the computer system performs the method of claim 1.

7. A non-transitory storage medium encoded with instructions, wherein the instructions when executed on a processor comprise:

receiving a request from a client, wherein the request comprises a specification of a static location and a dynamic location;

creating a static image, wherein the static image comprises a map that represents an area centered around the static location, wherein the static image does not move;

creating a dynamic image asynchronously from the creating the static image;

generating an amalgamated image comprising the static image and the dynamic image, wherein the generating further comprises generating the dynamic image at the dynamic location over a portion of the static image;

sending the amalgamated image to the client, wherein the client displays the amalgamated image; and moving the dynamic image in the amalgamated image with respect to the static image, wherein the moving further comprises receiving a second request from the client, wherein the second request comprises a new dynamic location and moving the dynamic image to the new dynamic location in response to the receiving the second request, wherein the moving represents a movement of a physical object through the area represented by the map, and wherein the dynamic location specifies a location of the client and wherein the dynamic location and the static location are initially identical and wherein the dynamic location moves away from the static location over time.

8. The non-transitory storage medium of claim 7, wherein the second request further comprises the static location.

9. The non-transitory storage medium of claim 7, wherein the creating the static image and the creating the dynamic image are performed in parallel.

10. The non-transitory storage medium of claim 7, further comprising:

creating object data representing the map prior to the receiving the request, wherein the creating the static image reads the object data.

11. A computer system comprising:

a processor; and memory connected to the processor, wherein the memory encodes instructions that when executed by the processor comprise:

receiving a request from a client, wherein the request comprises a specification of a static location and a dynamic location, creating a static image, wherein the static image comprises a map that represents an area centered around the static location, wherein the static image does not move, creating a dynamic image asynchronously from the creating the static image, generating an amalgamated image comprising the static image and the dynamic image, wherein the generating further comprises generating the dynamic image at the dynamic location over a portion of the static image, sending the amalgamated image to the client, wherein the client displays the amalgamated image; and moving the dynamic image in the amalgamated image with respect to the static image, wherein the moving further comprises receiving a second request from the client, wherein the second request comprises a new dynamic location, and moving the dynamic image to the new dynamic location in response to the receiving the second request, wherein the moving represents a movement of a physical object through the area represented by the map, and wherein the dynamic location specifies a location of the client and wherein the dynamic location and the static location are initially identical and wherein the dynamic location moves away from the static location over time.

12. The computer system of claim 11, wherein the second request further comprises the static location.

13. The computer system of claim 11, wherein the creating the static image and the creating the dynamic image are performed in parallel.

14. The computer system of claim 11, wherein the instructions further comprise:

creating object data representing the map prior to the receiving the request, wherein the creating the static image reads the object data.

* * * * *